US008012582B2

(12) United States Patent
Luo et al.

(10) Patent No.: US 8,012,582 B2
(45) Date of Patent: Sep. 6, 2011

(54) SINTERED PROPPANT MADE WITH A RAW MATERIAL CONTAINING ALKALINE EARTH EQUIVALENT

(75) Inventors: Hongyu Luo, Duncan, OK (US); Ashok Santra, Duncan, OK (US); Lewis R. Norman, Duncan, OK (US); Mark Parker, Lindale, TX (US); Ronald J. Powell, Duncan, OK (US); Rajesh K. Saini, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 23 days.

(21) Appl. No.: 12/284,814

(22) Filed: Sep. 25, 2008

(65) Prior Publication Data

US 2010/0071901 A1 Mar. 25, 2010

(51) Int. Cl.
*C09K 8/80* (2006.01)
*E21B 43/267* (2006.01)

(52) U.S. Cl. ............... 428/403; 166/280.2; 264/125; 428/372; 428/454; 507/269

(58) Field of Classification Search ............... None
See application file for complete search history.

(56) References Cited

U.S. PATENT DOCUMENTS

| | | | |
|---|---|---|---|
| 3,888,311 A | 6/1975 | Cooke, Jr. | 166/280 |
| 4,427,068 A | 1/1984 | Fitzgibbon | 166/280 |
| 4,522,731 A | 6/1985 | Lunghofer | 252/8.55 |
| 6,372,678 B1 | 4/2002 | Youngman et al. | 501/128 |
| 6,406,789 B1 | 6/2002 | McDaniel et al. | 428/402 |
| 6,457,524 B1 | 10/2002 | Roddy | 166/293 |
| 6,582,819 B2 | 6/2003 | McDaniel et al. | 428/402 |
| 6,632,527 B1 | 10/2003 | McDaniel et al. | 428/402 |
| 6,648,962 B2 | 11/2003 | Berke et al. | 106/464 |
| 6,753,299 B2 | 6/2004 | Lunghofer et al. | 507/269 |
| 6,772,838 B2 | 8/2004 | Dawson et al. | 166/280 |
| 6,780,804 B2 | 8/2004 | Webber et al. | 501/128 |
| 7,067,445 B2 | 6/2006 | Webber et al. | 501/128 |
| 7,160,844 B2 | 1/2007 | Urbanek | 507/269 |
| 7,270,879 B2 | 9/2007 | McCrary | 428/402 |
| 7,322,411 B2 | 1/2008 | Brannon et al. | 166/280.2 |
| 7,341,104 B2 | 3/2008 | Roddy | 166/280.2 |
| 7,392,847 B2 | 7/2008 | Gatlin et al. | 166/308.1 |
| 2002/0025436 A1 | 2/2002 | Meyer | |
| 2002/0048676 A1 | 4/2002 | McDaniel et al. | 428/404 |
| 2002/0058581 A1 | 5/2002 | Youngman et al. | 501/155 |
| 2003/0148893 A1 | 8/2003 | Lunghofer et al. | 507/200 |
| 2004/0261999 A1 | 12/2004 | Nguyen | 166/292 |
| 2005/0096207 A1 | 5/2005 | Urbanek | 501/6 |
| 2005/0173117 A1 | 8/2005 | Roddy | 166/293 |
| 2006/0078682 A1 | 4/2006 | McDaniel et al. | 427/372.2 |
| 2006/0081371 A1 | 4/2006 | Duenckel et al. | 166/280.2 |
| 2007/0131425 A1 | 6/2007 | Gatlin et al. | 166/280.2 |
| 2007/0166541 A1 | 7/2007 | Smith et al. | 428/402 |
| 2007/0202318 A1 | 8/2007 | Smith et al. | 428/323 |
| 2008/0073083 A1 | 3/2008 | Lunghofer et al. | 166/280.2 |
| 2008/0087136 A1 | 4/2008 | Elk | 75/233 |
| 2008/0135245 A1 | 6/2008 | Smith et al. | |
| 2009/0044941 A1 * | 2/2009 | De Paiva Cortes et al. | 166/280.1 |

FOREIGN PATENT DOCUMENTS

| | | |
|---|---|---|
| GB | 2426023 A | 11/2006 |
| WO | WO 2006/032008 | 3/2006 |
| WO | WO 2008/105678 | 9/2008 |

OTHER PUBLICATIONS

PCT International Search Report; PCT/GB2009/002263; issued Jan. 12, 2010.
Dylmar Peneteado Dias and Celio Thaumaturgo, "Fracture Toughness of Geopolymeric Concretes Reinforced with Basalt Fibers," Cement & Concrete Composites, 22 pp. 49-54, 2005.
R.S. Hay, "The Use of Solid-State Reactions With Volume Loss to Engineer Stress and Porosity Into the Fiber Matrix Interface of a Ceramic Composite," Acta Metal. Mater., vol. 43, No. 9, pp. 3333-3347, 1995.

* cited by examiner

*Primary Examiner* — Zakiya W. Bates
(74) *Attorney, Agent, or Firm* — Robert A. Kent; Booth Albanesi Schroeder LLC

(57) ABSTRACT

A method of making a proppant is provided, wherein the method includes the steps of: (a) forming a particulate comprising: (i) a binder; and (ii) a filler; and (b) sintering the particulate to form a sintered proppant, wherein the sintered proppant comprises: (i) at least 20 wt % of alkaline earth oxide equivalent; and (ii) at least 20 wt % of silicon dioxide equivalent. A method of treating (e.g., fracturing) a subterranean formation is provided, the method including the steps of: (a) suspending the sintered proppant in a treatment fluid; and (b) introducing the sintered proppant into the subterranean formation. The sintered proppant is made with a raw material selected from the group consisting of: unhydrated cement, hydrated cement (e.g., construction cement or concrete waste), kiln dust, fly ash, limestone, lime, talc, olivine, dolomite, clay that contains a substantial concentration of alkaline earth oxide equivalent, and any combination thereof in any proportion.

22 Claims, 3 Drawing Sheets

SINTERED PROPPANT MADE WITH A RAW MATERIAL CONTAINING ALKALINE EARTH EQUIVALENT

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

SUMMARY OF THE INVENTION

According to a first aspect of the invention, a method of making a proppant is provided. The method includes the steps of: (a) forming a particulate comprising: (i) a binder; and (ii) a filler; wherein the binder or the filler for the particulate comprises a raw material selected from the group consisting of: unhydrated cement, hydrated cement (e.g., construction cement or concrete waste), kiln dust, fly ash, limestone, lime, talc, olivine, dolomite, clay that contains a substantial concentration of alkaline earth oxide equivalent, and any combination thereof in any proportion; and (b) sintering the particulate to form a sintered proppant, wherein the sintered proppant comprises: (i) at least 20 wt % of alkaline earth oxide equivalent; and (ii) at least 20 wt % of silicon dioxide equivalent.

According to a second aspect of the invention, a method of treating a subterranean formation is provided, the method including the steps of: (a) suspending a sintered proppant in a treatment fluid, wherein the sintered proppant comprises: (i) at least 20 wt % of alkaline earth oxide equivalent; and (ii) at least 20 wt % of silicon dioxide equivalent; wherein a raw material for the sintered proppant is selected from the group consisting of: unhydrated cement, hydrated cement (e.g., construction cement or concrete waste), kiln dust, fly ash, limestone, lime, talc, olivine, dolomite, clay that contains a substantial concentration of alkaline earth oxide equivalent, and any combination thereof in any proportion; and (b) introducing the sintered proppant into the subterranean formation.

According to a third aspect of the invention, a sintered proppant is provided, wherein the sintered proppant comprises: (i) at least 20 wt % of alkaline earth oxide equivalent; and (ii) at least 20 wt % of silicon dioxide equivalent; wherein a raw material for the sintered proppant is selected from the group consisting of: unhydrated cement, hydrated cement (e.g., construction cement or concrete waste), kiln dust, fly ash, limestone, lime, talc, olivine, dolomite, clay that contains a substantial concentration of alkaline earth oxide equivalent, and any combination thereof in any proportion.

As used herein, the words "comprise," "has," and "include" and all grammatical variations thereof are each intended to have an open, non-limiting meaning that does not exclude additional elements or steps.

These and other features and advantages of the present invention will be more readily appreciated by a person of skill in the art upon reading the detailed description of the invention.

BRIEF DESCRIPTION OF THE DRAWINGS

The accompanying drawings are incorporated into and form a part of the specification to illustrate several examples according to the presently most preferred embodiments of the present invention. The drawings are only for illustrating preferred and alternative examples of the inventive methods and structures and are not to be construed as limiting the invention to only the illustrated and described examples. The drawings include the following figures.

DETAILED DESCRIPTION OF THE INVENTION

Figure 1:
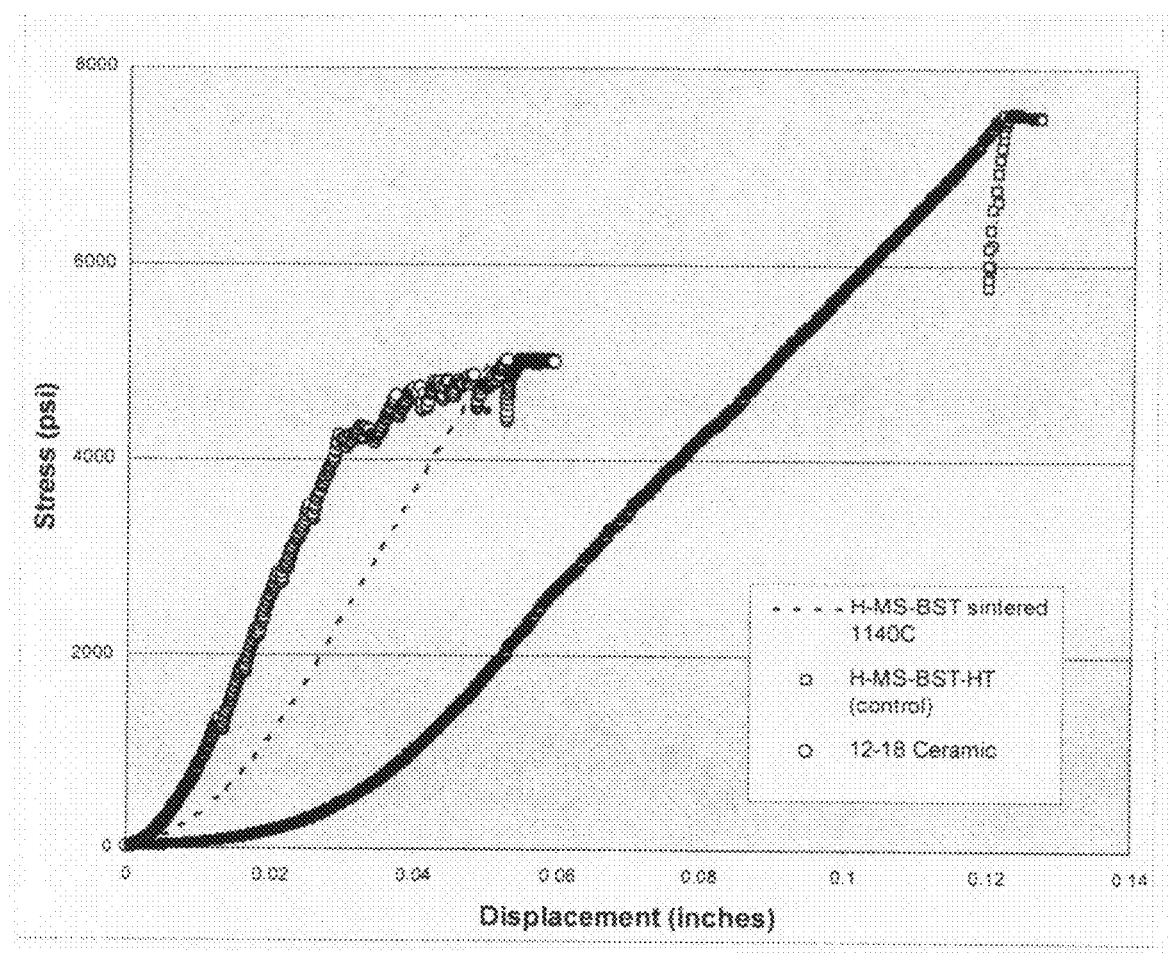
FIG. 1 is a graph of proppant pack deformation under closure stress.

A purpose of the present invention is to provide new methods of making a proppant and new compositions for a sintered proppant. The methods allow the use of low-cost and readily-available raw materials and a sintering temperature significantly lower than that for making conventional ceramic proppants. In particular, the sintered proppant includes a raw material selected from the group consisting of: unhydrated cement, hydrated cement (e.g., construction cement or concrete waste), kiln dust, fly ash, limestone, lime, talc, olivine, dolomite, clay that contains a substantial concentration of alkaline earth oxide equivalent, and any combination thereof in any proportion. As used herein, clay that contains a substantial concentration of alkaline earth oxide equivalent means clay containing at least 20% by weight of the alkaline earth oxide equivalent. As hereinafter explained, a proppant is used in fracturing operations to enhance production from an oil or gas well.

Oil and Gas Well Environment

Oil and gas hydrocarbons are naturally occurring in some subterranean formations, which are called reservoirs. As used herein, a well includes at least one wellbore drilled into the earth to try and reach an oil or gas reservoir and produce oil or gas from the reservoir.

As used herein, the term "wellbore" refers to the wellbore itself, including the openhole or uncased portion of the well. Further, as used herein, "into the wellbore" means and includes directly into and through the wellbore or into and through a casing, liner, or other tubular within the wellbore. The near-wellbore region is the subterranean material and rock of the subterranean formation surrounding the wellbore.

It is often desirable to treat a wellbore or a portion of a subterranean formation with various types of treatment fluids in the efforts to produce oil or gas from a reservoir. A treatment is designed to resolve a specific wellbore or reservoir condition. For example, stimulation is a treatment performed on a well to restore or enhance the productivity of the well. Stimulation treatments fall into two main groups, hydraulic fracturing and matrix treatments. Fracturing treatments are performed above the fracture pressure of the reservoir formation and create a highly-conductive flow path between the reservoir and the wellbore.

As used herein, a "treatment fluid" is a fluid designed and prepared to resolve a specific wellbore or reservoir condition. The treatment fluid may be for any of a wide variety of downhole purposes in a well, such as stimulation, isolation, or control of reservoir gas or water. The term "treatment" in the term "treatment fluid" does not necessarily imply any particular action by the fluid. As used herein, a fluid may or may not be a slurry, which is a suspension of insoluble particles (such as quartz, clay, etc.) in a fluid. The treatment fluids are often, but not necessarily, water based. It should be understood from the context of these inventions, of course, that, as used herein, a "fluid" is a continuous amorphous substance that tends to flow and to conform to the outline of its container as a liquid or a gas, when tested at a room temperature of 68° F. (20° C.) and standard pressure (1 atm).

Hydraulic Fracturing and Proppant

"Hydraulic fracturing," sometimes simply referred to as "fracturing," is a common stimulation treatment. A treatment fluid for this purpose is sometimes referred to as a "fracturing fluid." The fracturing fluid is pumped at a high flow rate and high pressure down into the wellbore and out into the formation. The pumping of the fracturing fluid is at a high flow rate and pressure that is much faster and higher than the fluid can escape through the permeability of the formation. Thus, the high flow rate and pressure creates or enhances a fracture in the subterranean formation. Creating a fracture means making a new fracture in the formation. Enhancing a fracture means enlarging a pre-existing fracture in the formation.

For pumping in hydraulic fracturing, a "frac pump" is used, which is a high-pressure, high-volume pump. Typically, a frac pump is a positive-displacement reciprocating pump. These pumps generally are capable of pumping a wide range of fluid types, including corrosive fluids, abrasive fluids, and slurries containing relatively large particulates, such as sand. The collection of equipment used in fracing is referred to as a "frac spread". Using a frac spread, the fracturing fluid may be pumped down into the wellbore at high rates and pressures, for example, at a flow rate in excess of 100 barrels per minute (4,200 U.S. gallons per minute) at a pressure in excess of 5,000 pounds per square inch ("psi"). The pump rate and pressure of the fracturing fluid may be even higher, for example, pressures in excess of 10,000 psi are not uncommon.

To fracture a subterranean formation typically requires hundreds of thousands of gallons of fracturing fluid. Further, it is often desirable to fracture at more than one downhole location. For various reasons, including the high volumes of fracturing fluid required, ready availability, and historically low cost, the fracturing fluid is usually water-based.

When the formation fractures or an existing fracture is enhanced, the fracturing fluid suddenly has a fluid flow path through the crack to flow more rapidly away from the wellbore. As soon as the fracture is created or enhanced, the sudden increase in flow of fluid away from the well reduces the pressure in the well. Thus, the creation or enhancement of a fracture in the formation is indicated by a sudden drop in fluid pressure, which can be observed at the well head.

After it is created, the newly-created fracture will tend to close after the pumping of the fracturing fluid is stopped. To prevent the fracture from closing, a material must be placed in the fracture to keep the fracture propped open. This material is usually in the form of an insoluble particulate, which can be suspended in the fracturing fluid, carried downhole, and deposited in the fracture. The particulate material holds the fracture open while still allowing fluid flow through the permeability of the particulate. A particulate material to be used for this purpose is often referred to as a "proppant." When deposited in the fracture, the proppant forms a "proppant pack," and, while holding the fracture apart, provides forming conductive channels through which fluids may flow to the wellbore. For this purpose, the proppant typically is selected based on two characteristics: size range and strength.

The proppant must have an appropriate size to prop open the fracture and allow fluid to flow through the particulate pack, i.e., in between and around the particles making up the pack. Appropriate sizes of particulate for use as a proppant are typically in the range from 6 to 140 U.S. Standard Mesh, and more typically in the range of about 8 to about 100 Mesh.

The proppant must be sufficiently strong, e.g., have a sufficient API "crush strength," to prop the fracture open without being substantially crushed by the subterranean forces that would otherwise close the fracture.

As used herein, "proppant" means and refers to a particulate material that is suitable for use as a proppant pack or gravel pack, including without limitation sand or gravel, synthetic materials, manufactured materials, and any combinations thereof. For this purpose, "proppant" does not mean or refer to suspended solids, silt, fines, or other types of particulate smaller than 0.0625 mm. Further, it does not mean or refer to particulate larger than 64 mm. Of course, "proppant" also does not mean or refer to dissolved solids. The fracture, especially if propped open by a proppant pack, provides an additional flow path for the oil or gas to reach the wellbore, which increases the rate of oil and gas production from the well.

Conventional proppant materials include, but are not limited to, sand, walnut shells, sintered bauxite, glass beads, ceramic materials, and naturally-occurring materials. Mixtures of proppants can be used as well. One of the most common proppants is sand, which geologically is defined as having a particle size ranging in diameter from about 0.0625 millimeters ($\frac{1}{16}$ mm) up to about 2 millimeters. (The next smaller size class in geology is silt: particles smaller than 0.0625 mm down to 0.004 mm in diameter. The next larger size class above sand is gravel, with particles ranging from greater than 2 mm up to 64 mm.)

The concentration of proppant in the fluid can be any concentration known in the art, and preferably will be in the range of from about 0.03 to about 3 kilograms of proppant added per liter of liquid phase (0.25-25 lb/gal). Also, any of the proppant particles can be coated with a resin to potentially improve the strength, clustering ability, and flow-back properties of the proppant.

Preferable characteristics of a proppant are that it has a roundness of at least 0.6 and a sphericity of at least 0.6 (Krumbien and Sloss, API RP 56).

It should be understood by a person of ordinary skill in the art that the composition of a treatment fluid, such as a fracturing fluid, may be varied during the course of a well treatment. For example, to accommodate changes in the concentration of proppant to be carried down to the subterranean formation, expected changes in temperature over the course of the treatment, or to accommodate the longer duration that the first portions of a treatment fluid may need to maintain viscosity before breaking compared to the shorter duration that the later portions of a treatment fluid may need to maintain viscosity over the course of injecting large quantities of treatment fluid. These changes may be made in stepped changes of concentrations or ramped changes of concentrations. Further, certain components of the fluid may be changed, for example, the catalyst for the breaker may be changed from the beginning to the end as another mechanism to control the different break times required from the first portions of a treatment fluid compared to the later portions of a treatment fluid. Further, for example, a treatment fluid for a fracturing operation may have a ramped-up concentration of proppant or have a higher "tail-end" concentration of a particulate (such as a proppant). For the purposes of designing a treatment fluid, such changes are expected, and the design of the treatment fluid is for one or more representative stages of the treatment fluid as it is to be introduced through a wellbore.

Viscosity-Increasing Agent to Help Suspend Proppant

The proppant material typically has a much higher density than water. For example, sand has a specific gravity of about 2.7. Any proppant suspended in the water will tend to separate quickly and settle out from the water very rapidly. To help suspend the proppant (or other particulate with a substantially different density than water) in a water-based fracturing fluid, it is common to use a viscosity-increasing agent for the purpose of increasing the viscosity of water.

Viscosity is the resistance of a fluid or slurry to flow, defined as the ratio of shear stress to shear rate. The unit of viscosity is Poise, equivalent to dyne-sec/cm$^2$. Because one poise represents a relatively high viscosity, $1/100$ poise, or one centipoise ("cP"), is usually used with regard to well treatment fluids. Viscosity must have a stated or an understood shear rate in order to be meaningful. Measurement temperature also must be stated or understood. As used herein, if not otherwise specifically stated, the viscosity is measured with a Fann Model 50 type viscometer (Fann Instrument Company, Houston, Tex.) at a shear rate of 40 l/s and at 25° C. (77° F.).

The viscosity of water is about 1 cP. A viscosity-increasing agent is a chemical additive that alters fluid rheological properties to increase the viscosity of the fluid. A viscosity-increasing agent can be used to increase the viscosity, which increased viscosity can be used, for example, to help suspend a proppant material in the treatment fluid. As used herein, a "base gel" is a fluid that includes a viscosity-increasing agent, such as guar, but that excludes, for example, fluids that are typically referred to as "cross-linked gels" and "surfactant gels."

Because of the high volume of fracturing fluid used in fracturing, it is desirable to increase the viscosity of fracturing fluids efficiently in proportion to the concentration of the viscosity-increasing agent. Being able to use only a small concentration of the viscosity-increasing agent requires less total amount to achieve the desired fluid viscosity in a large volume of fracturing fluid. Efficient and inexpensive viscosity-increasing agents include water-soluble polymers such as guar gum. Other types of viscosity-increasing agents may also be used for various reasons, for example, in high-temperature applications.

The viscosity of solutions with viscosity-increasing agents can be greatly enhanced by crosslinking the viscosity-increasing agent with a cross-linking agent. For example, guar gum and similar viscosity-increasing agents can be crosslinked with boric acid or other boron containing materials. Thus, boron crosslinked guar gum solutions are commonly used as fracturing fluids. Of course, there are numerous other types of cross-linking agents. As discussed herein, however, crosslinking is undesirable for certain types of well treatments, such as water-frac treatments. Further, the presence of a substantial concentration of boron in the water, either naturally occurring or in produced water may cause undesirable cross-linking.

Adding Crosslinker, Breaker, Surfactant, and Other Additives

Optionally, one or more other additives may be included to form a treatment fluid to be delivered into a wellbore for various purposes, for example, to stimulate the formation. Such additives are typically introduced or mixed into the fluid at a point after hydration of the hydratable additive begins. Normally, there is a time of several minutes before the treatment fluid pumped into the wellbore reaches the formation.

An example of another type of additive is a crosslinking agent. The viscosity of solutions of guar gum and other viscosity-increasing agents (sometimes referred to as "thickeners") can be greatly enhanced by crosslinking them. One example of a crosslinking agent is boric acid. In various embodiments, the boron crosslinking agent is also provided in the polymer stream as a mixture of dry ingredients or as part of a petroleum oil emulsion.

Fluids used in the invention also commonly include a breaker. A breaker is a chemical used for the purpose of diminishing or "breaking" the viscosity of the fluid so that this fluid can be recovered more easily from the formation during cleanup. With regard to breaking down viscosity, oxidizers, enzymes, or acids may be used, including delayed release or encapsulated breakers. Breakers reduce the polymer's molecular weight by the action of an acid, an oxidizer, an enzyme, or some combination of these on the polymer itself. In the case of borate-crosslinked gels, increasing the pH, and, therefore, increasing the effective concentration of the active crosslinker, the borate anion, creates reversible crosslinks. Lowering the pH can eliminate the borate/polymer bonds. At a high pH above 8, the borate ion exists and is available to crosslink and cause gelling. At a lower pH, the borate is not active as a crosslinker, thus, increases in viscosity due to crosslinking by borate ion are reversible.

Some fluids used in the invention may also include a surfactant. For example, a surfactant may be used for its ability to aid the dispersion and/or stabilization of a gas component into the fluid. Viscoelastic surfactants are also suitable for use in the treatment fluids.

Fluids used in the invention may further contain other additives and chemicals that are known to be commonly used in oil field applications by those skilled in the art. These include, but are not necessarily limited to, breaker aids, co-surfactants, oxygen scavengers, alcohols, scale inhibitors, corrosion inhibitors, fluid-loss additives, oxidizers, bactericides, biocides, and the like.

PREFERRED EMBODIMENTS ACCORDING TO THE INVENTION

A purpose of the present invention is to provide new methods of making a proppant and new compositions for a sintered proppant. The methods and resulting sintered proppant overcomes the disadvantages of prior approaches.

According to a first aspect of the invention, a method of making a proppant is provided. The method includes the steps of: (a) forming a particulate comprising: (i) a binder; and (ii) a filler; wherein the binder or the filler for the particulate comprises a raw material selected from the group consisting of: unhydrated cement, hydrated cement (e.g., construction cement or concrete waste), kiln dust, fly ash, limestone, lime, talc, olivine, dolomite, clay that contains a substantial concentration of alkaline earth oxide equivalent, and any combination thereof in any proportion; and (b) sintering the particulate to form a sintered proppant, wherein the sintered proppant comprises: (i) at least 20 wt % of alkaline earth oxide equivalent; and (ii) at least 20 wt % of silicon dioxide equivalent.

According to a second aspect of the invention, a method of treating (e.g., fracturing) a subterranean formation is provided, the method including the steps of: (a) suspending a sintered proppant in a treatment fluid, wherein the sintered proppant comprises: (i) at least 20 wt % of alkaline earth oxide equivalent; and (ii) at least 20 wt % of silicon dioxide equivalent; wherein a raw material for the sintered proppant is selected from the group consisting of: unhydrated cement, hydrated cement (e.g., construction cement or concrete waste), kiln dust, fly ash, limestone, lime, talc, olivine, dolomite, clay that contains a substantial concentration of alkaline earth oxide equivalent, and any combination thereof in any proportion; and (b) introducing the sintered proppant into the subterranean formation (e.g., a fracture).

According to a third aspect of the invention, a sintered proppant is provided, wherein the sintered proppant comprises: (i) at least 20 wt % of alkaline earth oxide equivalent; and (ii) at least 20 wt % of silicon dioxide equivalent; wherein a raw material for the sintered proppant is selected from the group consisting of: unhydrated cement, hydrated cement (e.g., construction cement or concrete waste), kiln dust, fly ash, limestone, lime, talc, olivine, dolomite, clay that contains a substantial concentration of alkaline earth oxide equivalent, and any combination thereof in any proportion. As used herein, "alkaline earth oxide equivalent," "calcium oxide equivalent," magnesium oxide equivalent," and "silicon dioxide equivalent" means the content of alkaline earth elements, calcium, magnesium, and silicon, respectively, which upon sintering would form various species of such oxides, respectively. For example, silica and quartz are essentially silicon dioxide, whereas the mineral wollastonite, $CaSiO_3$, has a ratio of one calcium oxide equivalent and one silicon dioxide equivalent.

Preferably, the sintered proppant comprises at least 20 wt % of calcium oxide equivalent, magnesium oxide equivalent, and any combination thereof in any proportion. More preferably, the sintered proppant comprises at least 20 wt % calcium oxide equivalent.

Preferably, the sintered proppant has a ratio of alkaline earth oxide equivalent to silicon dioxide equivalent of less than or equal to 1 on a weight basis. More preferably, the sintered proppant has a ratio of alkaline earth oxide to silicon dioxide equivalent of less than or equal to 0.8. Most preferably, the sintered proppant has a ratio of alkaline earth oxide to silicon dioxide equivalent of less than or equal to 0.6. It is believed that the lower ratios tend to produce sintered proppant having higher crush strength.

According to a preferred embodiment, the particulate further comprises a fiber for reinforcing the sintered proppant, wherein the reinforcing fiber is inert to the step of sintering. As used herein, a "reinforcing fiber" is defined as a particulate having an aspect ratio of greater than or equal to 1.2.

Preferably the reinforcing fiber is or comprises basalt fiber. Basalt is a dark gray to black, dense to fine-grained, igneous rock that consists of basic plagioclase, augite, and usually magnetite. Basalt fiber is a material made from extremely fine fibers of basalt. It is similar to carbon fiber and fiberglass, having better mechanical properties than fiberglass, but being significantly cheaper than carbon fiber. It is used as a fireproof textile in the aerospace and automotive industries and can also be used in composite materials. The manufacture of basalt fiber requires the melting of the quarried basalt rock to about 1,400° C. (2,550° F.). The molten rock is then extruded through small nozzles to produce continuous filaments of basalt fiber. The fibers typically have a filament diameter of between 9 and 13 µm which is far enough above the respiratory limit of 5 µm to make basalt fiber a suitable replacement for asbestos. They also have a high elastic modulus, resulting in excellent specific tenacity—three times that of steel. For example, the basalt fiber for use in the present invention can have a length in the range of 0.001 to 0.2 mm (e.g., 0.2 mm). Preferably, the basalt fiber is present in the sintered proppant in the range of 1 to 20 wt %.

For the step of forming a particulate, the step is preferably adapted to form a particulate having a mesh size in the range of 6 to 140 U.S. Mesh. The step is preferably adapted to form a particulate having a roundness of at least 0.6 and a sphericity of at least 0.6. Most preferably, the step is adapted to form a particulate having all of these characteristics. The step of forming a particulate can include, for example, mixing the binder and the filler in a blender.

According to one preferred embodiment of the step of forming a particulate, the binder can comprise an unhydrated cement and water. Unhydrated cement is made from powder of alumina, silica, lime, iron oxide, and magnesium oxide burned together in a kiln and finely ground. It is commonly used as an ingredient of mortar, grout, concrete, and other mixtures used for similar purposes. An example of cement is Class H oilwell cement, which has high sulfate-resistance, intended for use from surface to depths down to 8,000 feet when special properties are not required. The unhydrated cement preferably has an average particle size distribution in the range of 10-100 µm (approximately 400 mesh). The proportion of unhydrated cement to water is preferably at least sufficient to at least partially hydrate the unhydrated cement, whereby as the at least partial curing helps hold the particulate together during the sintering step. For example, the step of at least partially curing can comprise hydrothermally curing the unhydrated cement. It is important to note that the unhydrated cement is a source of alkaline earth oxide equivalent in the sintered proppant, and especially a source of calcium oxide equivalent.

According to another preferred embodiment of the step of forming a particulate, the binder comprises organic glue. For example, a organic glue is preferably present in the range of 0.5-2% by weight of the filler. The glue can be selected, for example, from the group consisting of: polyvinyl alcohol ("PVA"), polylactic acid, and any combination thereof in any proportion. According to this preferred embodiment, the step of forming a particulate further comprises at least partially curing the glue. For example, the step of at least partially curing the glue can comprise thermally curing the glue. The glue should be present in a sufficient amount and cured sufficiently to help hold the particulate together at least during the initial part of the sintering step.

The step of forming the particulate can further include using a liquid at the mixing temperature as part of the binder to help disperse and deliver the binder (e.g., transport cement or dissolve an organic glue) and to help the wettability in forming the particulate, which can help form and hold together the particulate. The liquid can be selected, for example, from the group consisting of: water, an alcohol having fewer than 10 carbons, a polymeric binder, and any combination thereof in any proportion. The step of forming a particulate can further include the step of mixing the liquid with the filler. Preferably, the binder includes a friction reducer to help in the forming of the particulate.

In the step of forming the particulate, the filler is preferably in the form of a particulate having an average particle size distribution in the range of 1 nm to 100 µm. The step of forming the particulate can further include the step of grinding the filler material to such a fine particle size.

According to a preferred embodiment for the step of forming a particulate, the filler comprises a raw material selected from the group consisting of: hydrated cement (e.g., construction cement or concrete waste), kiln dust, fly ash, limestone, lime, talc, olivine, dolomite, clay that contains a substantial concentration of alkaline earth oxide equivalent, and any combination of the foregoing in any proportion. These raw materials have a high alkaline earth oxide equivalent. These materials are relatively cheap materials and readily available. They help the particulate sinter at a lower temperature than a particulate without such a high alkaline earth oxide equivalent. Another advantage of being able to use these materials in higher concentration in the sintered proppant is the lower cost of the raw material and ready availability compared to other raw materials, while still maintaining sufficient proppant crush strength for many fracturing application.

The filler may also comprise quartz, which provides a source of silicon-dioxide equivalent. Other suitable materials for the filler include materials selected from the group consisting of: talc (a source of magnesium silicate); clay (e.g., bauxite as a source of aluminum silicate), natural zeolite; and any combination thereof in any proportion.

According to the invention, a raw material for the sintered proppant is selected from the group consisting of: unhydrated cement, hydrated cement (e.g., construction cement or concrete waste), kiln dust, fly ash, limestone, lime, talc, olivine, dolomite, clay that contains a substantial concentration of alkaline earth oxide equivalent, and any combination thereof in any proportion. As used herein, the term "raw material" means and refers to the chemical state of a material when it is initially mixed together to form the uncured particulate (sometimes referred to as "green balls") prior to the step of sintering. Preferably, such raw material accounts for at least 20% by weight of the sintered proppant.

The step of forming the particulate can optionally include mixing a porosity-generating agent (sometimes referred to as a "blowing agent") with the binder and filler for reducing the specific gravity of the sintered proppant. The porosity-generating agent is destroyed or generates gas bubbles during the sintering step to leave small voids in the sintered proppant. The porosity-generating agent can be selected, for example, from the group consisting of: calcium carbonate, sodium nitrate, organic polymers, and any combination thereof in any proportion.

The step of forming the particulate preferably further includes a step of dusting the uncured particulate (sometimes referred to as "green balls") with a dusting powder to form dry surfaces and help keep the particulate from sticking together prior to the step of sintering. As used herein, a dusting powder means a particulate having an average particle size in the range of 0.01 to 100 μm. An example of a suitable dusting powder includes talc powder, carbon powder, and any combination thereof in any proportion.

Preferably, the step of forming a particulate further comprises the step of at least partially curing the binder at least sufficiently to maintain the integrity of the size and shape characteristics of the particulate during at least the initial stage of the step of sintering. The step of curing may comprise fully curing the binder in the particulate. In the case of using unhydrated cement as the binder, the step of curing may preferably comprises hydrothermally curing the binder in the particulate. In the case of an organic glue, the step of curing preferably comprises thermally curing the glue.

The term "sintering" as used herein refers to the process of heating a green particulate so that it becomes a substantially coherent mass. In addition, the selection of an appropriate sintering temperature should not be so low as to result in incomplete sintering, that is, not resulting a substantially coherent mass. Generally, for silicate materials it means heating to at least 800° C., but usually higher. As a rule of thumb for ceramics, sintering means heating to ⅔ of the melting temperature. For example, typical sintering temperatures for ceramic materials are in the range of 1,500-2,000° C. (2,730-3,630° F.). It is very costly to heat mineral materials to such temperatures, and the ability to sinter at lower temperatures would result in great energy cost savings.

According to the invention, the step of sintering is preferably performed at less than 1,200° C. (2,190° F.), and more preferably at less than 1,150° C. (2,100° F.). The ability to sinter at a lower temperature saves substantial energy costs. It is believed that at least 20% of alkaline earth oxide equivalent contributes to this lowering of the sintering temperature. It is further believed that in the range of 0.5-5% by weight iron oxide equivalent in the sintered proppant may also help lower the sintering temperature, but a higher concentration may undesirably result in high specific gravity and cause high acid solubility because iron oxides tend to be dissolvable in acid. Iron oxide equivalents are inherently present in many types inorganic cement materials, such as waste concrete or fly ash.

The step of sintering a particulate can be performed, for example, in a rotary kiln. The granulated green proppant particles are sintered preferably in a rotary kiln, or optionally in a microwave kiln.

The step of sintering the particulate increases the chemical resistance of the sintered proppant relative to the fully-cured particulate. This can be determined, for example, by testing the solubility of the cured particulate against the sintered proppant in an aqueous solution of 15% HCl for 30 minutes at 66° C. (150° F.). The step of sintering also increases the chemical resistance of the sintered proppant relative to the particulate as determined by solubility in an aqueous solution of 12% HCl and 3% HF for 30 minutes at 66° C. (150° F.). Preferably, the sintered proppant is less than 5% soluble in an aqueous solution of 15% HCl for 30 minutes at 66° C. (150° F.), and more preferably less than 3% soluble under such conditions. More preferably, the sintered proppant is less than 5% soluble in an aqueous solution of 12% HCl and 3% HF for 30 minutes at 66° C. (150° F.), and more preferably less than 3% soluble under such conditions.

The step of sintering increases the crush strength of the sintered proppant relative to the fully-cured particulate. Preferably, the step of sintering increases the stiffness (proppant pack deformation under closure stress) of the sintered proppant relative to the fully-cured particulate. More preferably, the sintered proppant has an API crush strength of at least 4,000 psi closure stress based on 10% crush fines. This performance is that of a medium strength proppant, where a very high crush strength would be 10,000 psi.

The step of sintering produces sintered proppant comprising mineral crystals having fiber forms. For example, the composition of the particulate and the step of sintering produces some of the mineral crystal wollastonite, which is a calcium silicate, specifically $CaSiO_3$. Other such mineral crystals that can be formed depending on the composition of the particulate before sintering would be expected to include magnesium silicate fiber.

The sintered proppant preferably has one or more of the following physical characteristics: high acid resistance, a crush strength greater than 4,000 psi, a mesh size in the range of 6-140 mesh, a roundness of at least 0.6, a sphericity of at least 0.6, and a specific gravity in the range of 1.2-3.0. Most preferably, the sintered proppant has all of these characteristics.

The method of making or using a proppant can further comprise the step of coating the sintered proppant with an organic material, such as a curable resin or tackifying material. For example, the organic material can be selected from the group consisting of: epoxy resin, phenolic resin, and any combination thereof in any proportion.

EXAMPLES

Cement particles can be granulated and have API crush strengths up to 7500 psi. However, the main issues were (1) special pressure curing was needed at ~200° C. (392° F.) for several days; (2) acid solubility was too high, being in the range of about 15-50 wt % in 15% HCl for 30 minutes at 66° C. (150° F.), which could not be easily lowered to <2% by various coatings; (3) serious fines generation in conductivity tests; and (4) the particles showed serious plastic deformation under closure stress, reducing the proppant pack porosity compared with more rigid ceramic proppants.

A number of cement proppant samples were used to explore the possibilities of sintering such materials. The samples were put in covered alumina crucibles and sintered in an electric box furnace. API crush testing was conducted on a Tinius Olsen press (Tinius Olsen, Willow Grove, Pa.). Acid solubility, SEM and XRD characterizations were also conducted for better understanding of their mechanical and chemical performances.

Two representative examples are discussed below. The Class H cement has 24 wt % $SiO_2$, 64 wt % CaO, 4.8 wt % $Fe_2O_3$, 3.4 wt % $Al_2O_3$, 1.7 wt % $SO_3$, other minor oxide contents and ~1 wt % loss on ignition ("LOI").

Example 1

Cement and Sand Proppant

In this example, a typical cement particulate for making a proppant is used, wherein the particulate has a base composition shown in Table 1. The final CaO content is about 32 wt %; and $SiO_2$ 62 wt %. The rest are $Al_2O_3$, $Fe_2O_3$ and other minor oxide contents. The particulate was made with unhydrated Class H cement, microsand, and water. Class H cement can be included as part of the binder. The Class H cement was in the form of a fine particulate, as discussed above, in the range of 4-100 μm. The water is part of the binder and upon mixing begins to hydrate the cement. A small amount of friction reducer ("CFR-3" which is commercially available from Halliburton Energy Services, Inc.) was included in the water to reduce friction during mixing. It is to be understood that any type of friction reducer is expected to be suitable to lubricate the mixing to form the particulate. Microsand is a filler material, basically fine sand having a small particle size in the range of 1-10 μm. The mixture of these materials forms a larger particulate of a size suitable for proppant including an intimate mixture of the finer particulates. The chemical composition of the formed particulate includes alkaline earth oxide equivalent minerals (particularly calcium oxide equivalent minerals), primarily from the Class H cement, and silicon dioxide equivalent minerals, primarily from the microsand.

TABLE 1

Raw Materials of "HH#2"

| Class H | Microsand | Water (3.3% CFR-3) |
| --- | --- | --- |
| 1000 g | 1000 g | 320 g |

Figure 2:
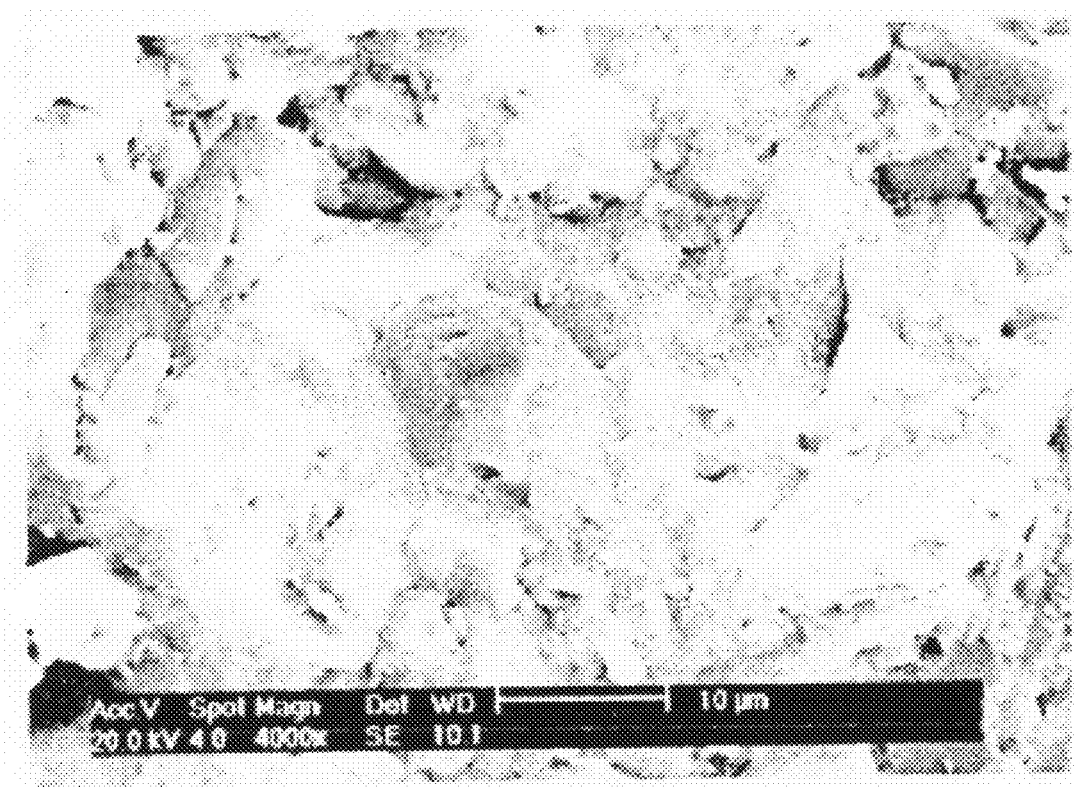
FIG. 2 is an SEM of sample "HH#2" that has been hydrothermally cured.

The raw materials, Class H cement and microsand, were blended in an Eirich (RV02E) Mixer to produce a particulate having a mesh size of 12-20. A portion of the particles was subsequently cured hydrothermally in a pressurized (i.e. 1000 psi) autoclave at an elevated temperature (e.g. 400° F.). Water was added to the particles to keep them from drying. X-ray diffraction ("XRD") indicates that quartz is the major crystalline phase in the hydrothermally-cured (400° F.) cement particles. FIG. 2 is an SEM of a sample of the hydrothermally-cured sample, "HH#2-HT."

TABLE 2

API crush fines (at closure stress of 5,000 psi) and acid solubility

| Sample Name | Above sieve | Below sieve | Total | Fines % | 15% HCl solubility |
| --- | --- | --- | --- | --- | --- |
| HH#2, 1150° C. sintered | 27.9 g | 4.3 g | 32.2 g | 13.4% | 3.8% |

Figure 3:
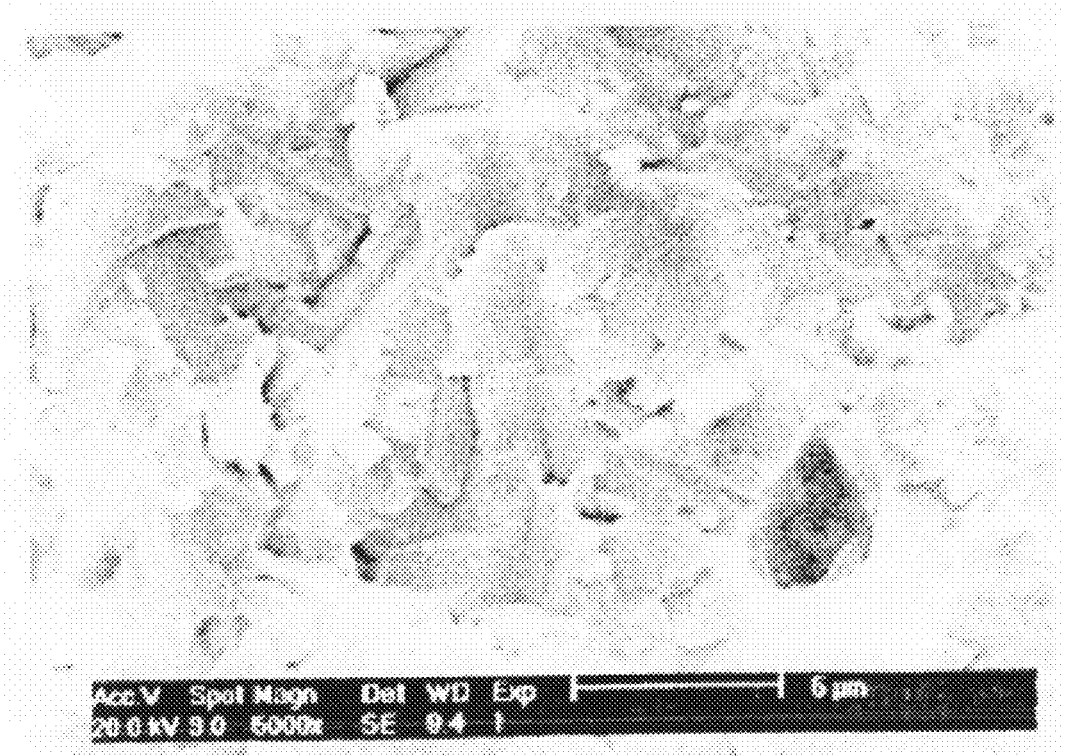
FIG. 3 is an SEM of fracture surface of sample "HH#2" that has been sintered at 1,150° C. for 1 hour.

Another portion of the hydrothermally cured particulates was sintered 1,150° C. for 1 hour in an electric furnace. After sintering, the loose-pack weight is 32.2 g for 25 mL particles (Table 2). For comparison, 25 mL of Ottawa sand is about 40 g, so the sintered particles is about 20% lighter than Ottawa sand. The crush strength and crush fines were determined using the "API RP 56" recommended procedure, which is well-known to those skilled in the art. Acid solubility is significantly reduced (Table 2) by sintering to be near the API requirement of less than 2%, which is also well known to those skilled in the art. After sintering, the major crystalline phases in the particles were wollastonite and secondarily quartz. FIG. 3 is an SEM of a sample of "HH#2-HT" subsequently sintered at 1,150° C. for 1 hour. Wollastonite is usually present as whiskers or needle-shaped crystals, which is verified by SEM (FIG. 3), where textured microstructure was visible, compared against the more isotropic microstructure in the hydrothermally-cured sample (FIG. 2). There were also micro pores (~5 μm) developed during sintering compared with the hydrothermally-cured sample where little porosity exists.

Example 2

Fiber-Strengthened Cement and Sand Proppant

Basalt fiber was used to strengthen cement particles. It was chopped into ~0.2 mm long (FIG. 4, lower part) and added to the composition according to Table 3. The final CaO content is about 32 wt %; and $SiO_2$ 60 wt %. The rest are $Al_2O_3$, $Fe_2O_3$ and other minor oxide contents.

The dry powders were weighed and put into the Eirich (RV02E) Mixer pan. The friction reducer was dissolved in water using a Waring blender. Then the friction reducer in the aqueous solution was added dropwise into the powder through the mixer window using a pump at around 1 mL/sec while the mixer was kept running at 300 rpm rotor speed and a 60 rpm rotating pan. After all the aqueous solution was added, the mixture became partially wet. Under high speed rotation (about 800 rpm), proppant-sized particles begin formed. When a significant portion (e.g. >90%) of the mixture was in the proper size range (e.g. 12-70 mesh), the mixing was stopped. The particles were then removed from the mixer; ready for curing and sintering.

After granulation, the particles were cured for about a day in a closed chamber to avoid water loss. Some of the 12-20 sized particles were further treated hydrothermally (400° F. in water under 2,000 psi hydraulic pressure for 3 days). The sample is labeled as "H-MS-BST-HT" and used as control to compare with the same material sintered at 1,140° C. for 1 hour.

TABLE 3

Raw materials for basalt-strengthened cement proppant ("H-MS-BST")

| Class H | Microsand | Basalt fiber | Water (3.3% CFR-3) |
|---------|-----------|--------------|---------------------|
| 1000 g  | 800 g     | 200 g        | 300 g               |

For 25 mL bulk volume of 12/20 particles, the total weight increased from 30.3 g for the hydrothermally cured particles to 32.7 g for the sintered particles (Table 4), indicating densification by sintering. For comparison, 25 mL of 12/18 of a lightweight conventional ceramic proppant is about 39.3 g, so the density of the sintered particles is about 83% of the conventional ceramic proppant. The fines percentage after 5,000 psi crush was 6.8%, and acid solubility is within the API requirement of less than 2%.

TABLE 4

API crush fines and acid solubility comparison

| Sample Name | Above sieve | Below sieve | Total | Fines % | 15% HCl solubility |
|-------------|-------------|-------------|-------|---------|---------------------|
| H-MS-BST-HT 12-20 mesh (control) tested at 7,500 psi | 24.9 g | 5.4 g | 30.3 g | 17.8% | — [1] |
| H-MS-BST-HT 12-20 mesh sintered at 1140° C.-1 hr tested at 5,000 psi | 30.49 g | 2.23 g | 32.7 g | 6.8% | 1.6% |
| conventional ceramic 12-18 mesh tested at 5,000 psi | 34.21 | 5.69 | 39.9 | 14.3% | 1.7% [2] |

[1] Data not available.
[2] Solubility in 12%/3% HCl/HF Acid.

The sintered cement particles with basalt fibers are as stiff as a conventional medium strength ceramic proppant and much stiffer than the hydrothermally-cured one as shown in the graph of FIG. 1. The crush strength and crush fines were determined using the "API RP 56" recommended procedure, which is well known to those skilled in the art. Also, they have less crush fines than the conventional medium-strength ceramic proppant. It is expected that the sintered basalt-strengthened cement particles can hold intermediate closure stress comparably well without losing much porosity and without generating a high percentage of fines.

Figure 4:
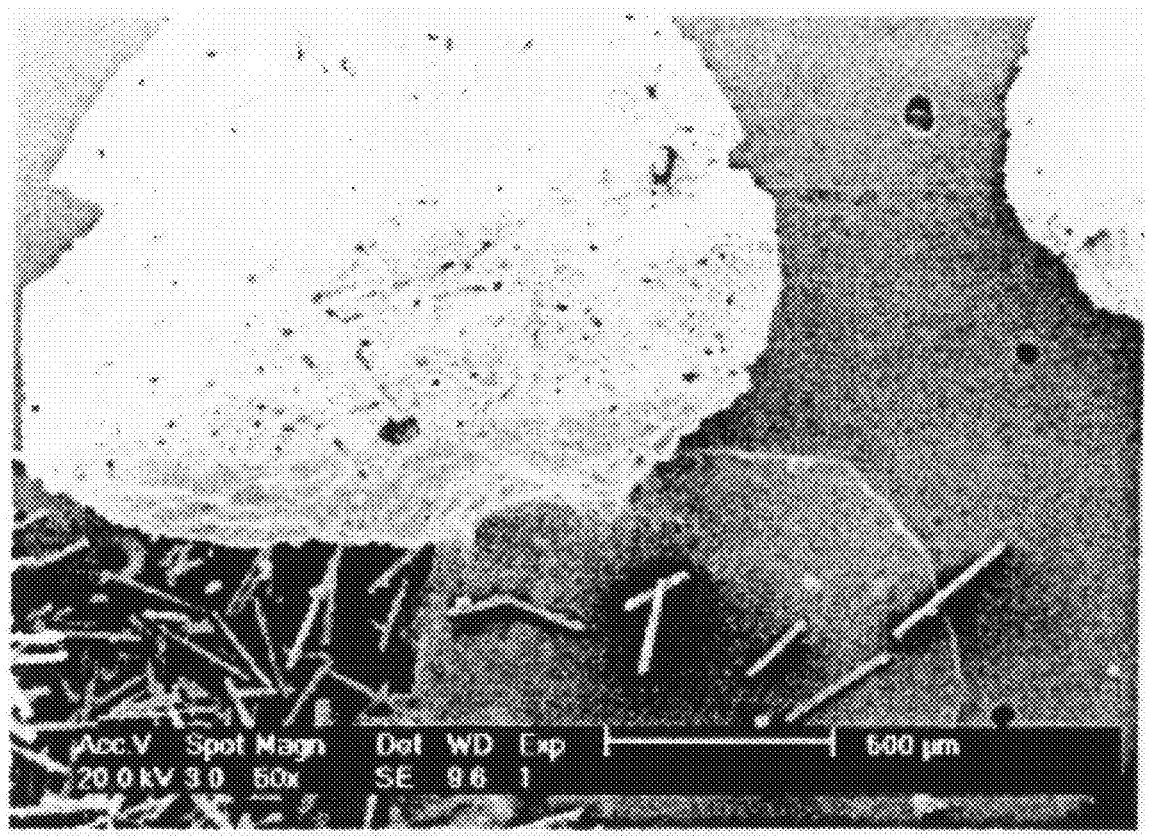
FIG. 4 is a photograph of the proppant and fibers (where the lower part of the photograph illustrates the relative dimension of the chopped basalt fibers used in the particles).

FIG. 4 shows the microstructure inside the sintered basalt-strengthened cement particles. Basalt fibers are seen debonded from the matrix. The matrix composition and basalt fiber geometry could be optimized to improve the strength further by inducing fiber pulling and crack deflection mechanisms.

The sintered proppant contains crystalline phases such as wollastonite ($CaSiO_3$) and quartz after sintering at around 1,150° C. It has roundness and sphericity above 0.7, and specific gravity around 2.1, and acid solubility is 1.6% (less than 2% as required by API). The mechanical performance is comparable with conventional intermediate-strength ceramic proppants that need to be sintered at around 1,500° C. Fibrous materials such as basalt fiber were found to be useful for strengthening. Clay, hydrated cement (e.g., construction cement, concrete waste, and any combination thereof in any proportion), kiln dust, fly ash, limestone, lime, talc, olivine, dolomite, clay that contains a substantial concentration of alkaline earth oxide equivalent are low-cost, readily-available raw materials according to the methods of making a sintered proppant according to the invention. Preferably, the sintered proppants consist mainly of calcium silicate and silica.

It is to be understood that numerous modifications, alterations, and changes can be made in the invention without departing from the spirit and scope of the invention as set forth in the appended claims. It is the intention to cover all embodiments and forms of the invention within the allowable scope of the claims.

What is claimed is:

1. A method of making a proppant, the method comprising the steps of:
   (a) forming a particulate comprising:
      (i) a binder; and
      (ii) a filler;
   wherein the binder or the filler for the particulate comprises a raw material selected from the group consisting of: unhydrated cement, hydrated cement, kiln dust, fly ash, limestone, lime, talc, olivine, dolomite, clay that contains a substantial concentration of alkaline earth oxide equivalent, and any combination thereof in any proportion; and
   (b) sintering the particulate to form a sintered proppant, wherein the sintered proppant comprises:
      (i) at least 20 wt % of alkaline earth oxide equivalent; and
      (ii) at least 20 wt % of silicon dioxide equivalent.

2. The method according to claim 1, wherein the sintered proppant has a ratio of alkaline earth oxide equivalent to silicon dioxide equivalent of less than or equal to 1 on a weight basis.

3. A sintered proppant according to claim 1, wherein at least 20% by weight of the sintered proppant is the raw material selected from the group consisting of: unhydrated cement, hydrated cement, kiln dust, fly ash, limestone, lime, talc, olivine, dolomite, clay that contains a substantial concentration of alkaline earth oxide equivalent, and any combination thereof in any proportion.

4. The method according to claim 1, wherein the particulate further comprises a reinforcing fiber for reinforcing the sintered proppant, wherein the fiber is inert to the step of sintering.

5. The method according to claim 1, wherein the binder comprises an unhydrated cement and water.

6. The method according to claim 1, wherein the binder comprises an organic glue.

7. The method according to claim 1, wherein the step of forming the particulate further comprises: including a friction reducer with the binder and filler.

8. The method according to claim 1, wherein the filler is in the form of a particulate having an average particle size distribution in the range of 1 nm to 100 μm.

9. The method according to claim 7, further comprising the step of: grinding the filler material.

10. The method according to claim 1, wherein the filler comprises a raw material selected from the group consisting of: hydrated cement, kiln dust, fly ash, limestone, lime, talc, olivine, dolomite, clay that contains a substantial concentration of alkaline earth oxide equivalent, and any combination thereof in any proportion.

11. The method according to claim 1, wherein the filler comprises quartz.

12. The method according to claim 1, where in the step of forming the particulate further comprises the step of at least partially curing the binder at least sufficiently to maintain the integrity of the size and shape characteristics of the particulate during the step of sintering.

13. The method according to claim 1, wherein the step of sintering is performed at less than 1,200° C. (2,192° F.).

14. The method according to claim 1, wherein the step of forming the particulate comprises including a porosity-generating agent for reducing the specific gravity of the sintered proppant.

15. The method according to claim 1, wherein the sintered proppant is less than 2 wt % soluble in an aqueous solution of 15% HCl for 30 minutes at 66° C. (150° F.).

16. The method according to claim 1, wherein the sintered proppant has a API crush strength of at least 4,000 psi closure stress based on 10% crush fines.

17. The method according to claim 1, wherein the sintered proppant has a mesh size in the range of 6-140 mesh.

18. The method according to claim 1, wherein the sintered proppant has a roundness of at least 0.6 and a sphericity of at least 0.6.

19. The method according to claim 1, wherein the sintered proppant has a specific gravity in the range of 1.2-3.0.

20. A sintered proppant comprising:
(i) at least 20 wt % of alkaline earth oxide equivalent; and
(ii) at least 20 wt % of silicon dioxide equivalent;
wherein a raw material for the sintered proppant is selected from the group consisting of: unhydrated cement, hydrated cement, kiln dust, fly ash, limestone, lime, talc, olivine, dolomite, clay that contains a substantial concentration of alkaline earth oxide equivalent, and any combination thereof in any proportion.

21. A sintered proppant according to claim 20, wherein the sintered proppant has a ratio of alkaline earth oxide equivalent to silicon dioxide equivalent of less than or equal to 1 on a weight basis.

22. A sintered proppant according to claim 20, wherein at least 20% by weight of the sintered proppant is the raw material selected from the group consisting of: unhydrated cement, hydrated cement, kiln dust, fly ash, limestone, lime, talc, olivine, dolomite, clay that contains a substantial concentration of alkaline earth oxide equivalent, and any combination thereof in any proportion.

* * * * *